(12) United States Patent
Bai et al.

(10) Patent No.: US 6,737,842 B2
(45) Date of Patent: May 18, 2004

(54) METHOD AND CIRCUITS FOR REDUCING DEAD TIME AND REVERSE RECOVERY LOSS IN BUCK REGULATORS

(75) Inventors: Yuming Bai, Blacksburg, VA (US); Nick Sun, Blacksburg, VA (US); Alex Q. Huang, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 10/268,912

(22) Filed: Oct. 11, 2002

(65) Prior Publication Data

US 2004/0070377 A1 Apr. 15, 2004

(51) Int. Cl.$^7$ .............................. G05F 1/656; G05F 1/44
(52) U.S. Cl. ....................... 323/282; 323/222; 323/284
(58) Field of Search ................................. 323/282, 222, 323/223, 285

(56) References Cited

U.S. PATENT DOCUMENTS

| | | | | |
|---|---|---|---|---|
| 5,912,552 A | * | 6/1999 | Tateishi | 323/285 |
| 5,994,885 A | * | 11/1999 | Wilcox et al. | 323/285 |
| 6,396,252 B1 | * | 5/2002 | Culpepper et al. | 323/285 |
| 6,534,960 B1 | * | 3/2003 | Wells et al. | 323/222 |
| 6,538,418 B2 | * | 3/2003 | Miyazaki | 323/284 |
| 6,541,947 B1 | * | 4/2003 | Dittmer et al. | 323/284 |
| 6,580,258 B2 | * | 6/2003 | Wilcox et al. | 323/282 |

* cited by examiner

*Primary Examiner*—Bao Q. Vu
(74) *Attorney, Agent, or Firm*—Whitham, Curtis & Christofferson, P.C.

(57) ABSTRACT

A buck regulator having a voltage sensor for sensing a voltage reversal caused by freewheeling current from an output inductor in the regulator. Upon sensing a reversed voltage, the voltage sensor triggers a gate controller to turn on a switch in the regulator, and thereby terminate a dead time. The voltage sensor and gate controller are high speed circuits, and therefore can reduce the duration of the dead time. Reducing the dead time duration improves efficiency by reducing the duration of body diode conduction. The dead time can be reduced to less than a turn-on time of the body diode, thereby preventing charge buildup in the body diode, and, consequently, preventing reverse recovery loss in the body diode. The present invention improves electrical conversion efficiency, and allows for increased operating frequency in buck regulators.

17 Claims, 7 Drawing Sheets

US 6,737,842 B2

METHOD AND CIRCUITS FOR REDUCING DEAD TIME AND REVERSE RECOVERY LOSS IN BUCK REGULATORS

FIELD OF THE INVENTION

The present invention relates generally to electrical power supplies. More particularly, it relates to a method and apparatus for reducing dead time and reverse recovery losses in buck regulators to provide increased efficiency and higher operating frequency.

BACKGROUND OF THE INVENTION

Buck regulators are commonly used in electronics for changing the voltage or polarity of a power supply. Buck regulators typically employ two electronic switches (typically MOSFETs) in combination with an output inductor. The switches are alternately turned on, thereby providing voltage pulses to the output inductor.

During portions (dead times) of the switching cycle, both switches are off. When both switches are off, the output inductor produces freewheeling current that flows through the integral body diode of one of the switches. Body diode current produces substantial energy loss due to the forward-bias voltage drop across the diode, thereby reducing the energy efficiency of the buck regulator. Additionally, reverse recovery loss occurs when the body diode later becomes reverse-biased. In order to improve the efficiency of buck regulators, body diode conduction and reverse recovery losses must be reduced.

In order to provide buck regulators with small size and weight, and reduced cost, it is best to operate the buck regulator at high frequency. However, energy loss from both body diode conduction and reverse recovery increase dramatically with increasing operating frequency. In this way, body diode conduction and reverse recovery tend to limit the maximum operating frequency of buck regulators.

It would be an advance in the art of buck regulator design to provide a buck regulator having greatly reduced dead time, and a greatly reduced or eliminated reverse recovery loss. Such a buck regulator could operate with very high efficiency compared to conventional buck regulators, and could operate at high frequency. High frequency capability can provide many benefits such as smaller size and weight, and reduced cost.

SUMMARY

The present invention includes a buck regulator having an output inductor, first and second switches, a voltage sensor, and a gate controller. The first and second switches and the inductor are connected at a swing node. The voltage sensor is connected to the swing node and senses a voltage at the swing node. An output of the voltage sensor is connected to the gate controller. The gate controller controls the second switch in response to signals from the voltage sensor.

The gate controller may also control the first switch. In one embodiment, the voltage sensor triggers the gate controller in response to a voltage reversal of greater than 0.3 volts at the swing node.

The voltage sensor can comprise a bipolar transistor with an emitter connected to the swing node, and a collector connected to the gate controller. A base of the bipolar transistor may be connected to a voltage within about 0.7 volts of ground potential. The bipolar transistor may be made from a parasitic bipolar transistor integral to a lateral diffusion (LD) MOSFET, commonly used in power integrated circuits.

The voltage sensor can also comprise a first sense MOSFET and a second sense MOSFET connected in series. The first sense MOSFET is connected to the swing node, and the second sense MOSFET is connected to the gate controller. Also, a current amplifier can be connected between the second sense MOSFET and the gate controller.

The gate controller may control both first and second switches in response to the output of the voltage sensor. Specifically, the gate controller can turn on the second switch when the voltage sensor detects a voltage reversal at the swing node resulting from turn off of the first switch. Also, the gate controller can turn on the first switch when the voltage sensor detects a voltage change close to 0.7 volts at the swing node resulting from turn off of the second switch.

In another aspect of the present invention, the buck regulator comprises an output inductor, first and second switches, a gate controller, and a voltage sensor comprising a bipolar transistor with an emitter connected to the swing node, and a collector connected to the gate controller. The bipolar transistor can comprise a parasitic bipolar transistor integral to an LDMOSFET. The base of the bipolar transistor can be connected to a voltage within about 0.7 volts of ground potential.

In yet another aspect of the present invention, the buck regulator comprises an output inductor, first and second switches, a gate controller, and a voltage sensor comprising a first sense MOSFET connected to the swing node, and a second sense MOSFET connected in series with the first sense MOSFET. The first sense MOSFET has a gate connected to a reference voltage; the second sense MOSFET has a gate connected to a ground potential, or to a voltage within 0.7 volts of ground potential. A current amplifier can be connected between the second sense MOSFET and the gate controller. The second sense MOSFET can be a MOSFET.

DETAILED DESCRIPTION OF THE INVENTION

The present invention provides a buck regulator with reduced body diode conduction loss, and reduced reverse recovery loss in a buck regulator. The present invention comprises a buck regulator with an output inductor and a voltage sensor for sensing the onset of a reversed voltage produced by freewheeling current from the output inductor. Once a reversed voltage is sensed, the sensor triggers a logic circuit which turns on an appropriate switch in the buck regulator. By rapidly sensing reversed voltage, the present buck regulator reduces dead time and associated body diode conduction losses and reverse recovery losses. The speed of the present invention is fast enough so that the buck regulator can change states before the body diode is fully conducting, thereby preventing reverse recovery losses. The present invention also provides several circuits for the high speed voltage sensor.

Figure 1:
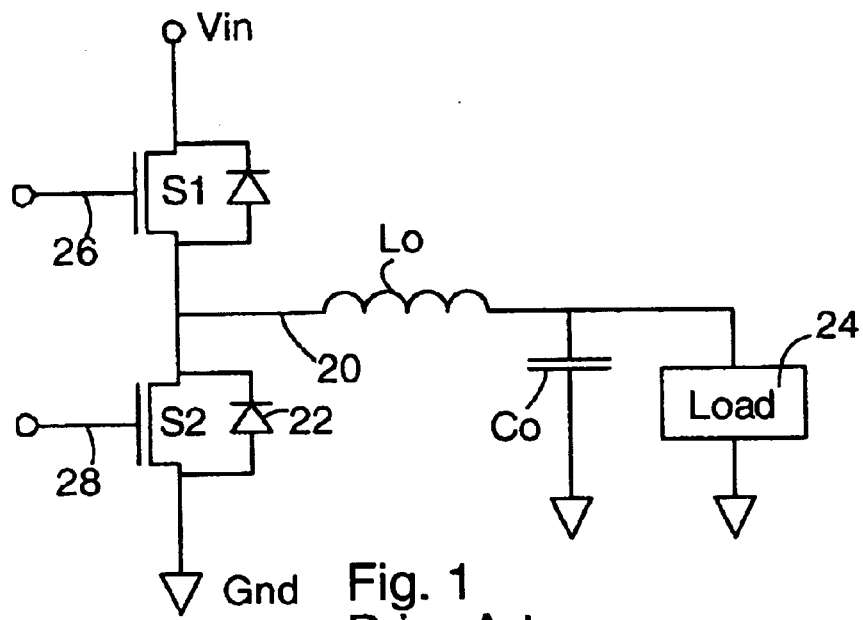
FIG. 1 (Prior Art) shows a conventional buck regulator according to the prior art.

FIG. 1 shows a conventional buck regulator having first switch S1 and second switch S2. Switches S1 and S2 can be MOSFET switches. Typically, at least second switch S2 (a MOSFET) has integral body diode 22. Switches S1 and S2 have control gates 26 and 28, respectively. Switches S1 and S2 are connected to output inductor Lo, and the output inductor is connected to an optional output capacitor Co and a load 24. The output inductor Lo and the switches S1 S2 are connected at a swing node 20. Switch S1 is connected to power source Vin; switch S2 is connected to ground potential Gnd.

Figure 2:
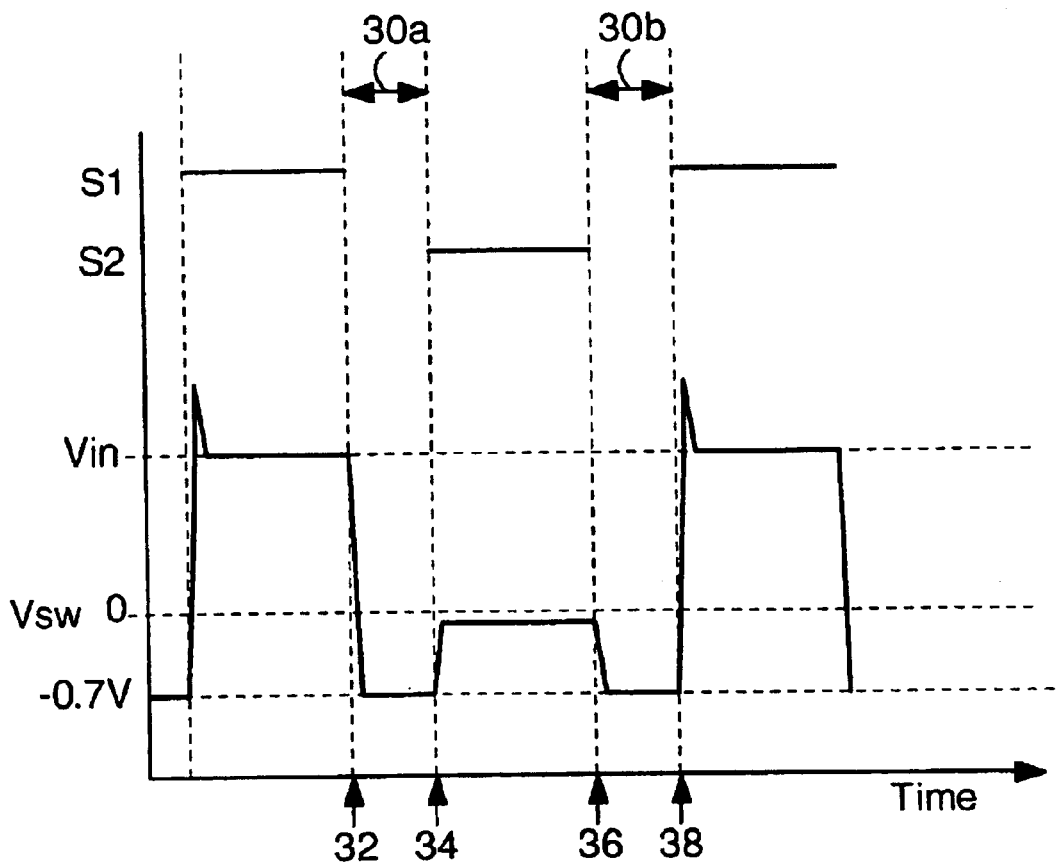
FIG. 2 (Prior Art) shows a timing diagram for the buck regulator of FIG. 1.

FIG. 2 shows a turning diagram illustrating the operation of the circuit of FIG. 1. Horizontal lines indicate when switches S1 and S2 are on. Vsw is the voltage at the swing node 20. The switches S1 and S2 are alternately turned on, and are never on at the same time. A first dead time 30a is established between S1 turn-off 32 and S2 turn-on 34; a second dead time 30b is established between S2 turn-off 36 and S1 turn-on 38. Dead times 30a 30b assure that switches S1 S2 are not on at the same time, which would destroy the switches S1 S2 or the power source. Output inductor Lo produces freewheeling current during both dead times, thereby causing voltage reversal (i.e. negative Vsw) during the dead times 30a 30b. Vsw is clamped at about −0.7 volts by the body diode 22, which conducts the freewheeling current during the dead times 30a 30b.

A problem with the circuit of FIG. 1 is that freewheeling current flows through the body diode 22 during the dead times 30a 30b, thereby wasting considerable energy and reducing the buck regulator efficiency. Another problem with the circuit of FIG. 1 is that the body diode 22 experiences reverse recovery at the S1 turn-on time 38. The reverse recovery of the body diode 22 after second dead time 30b produces a substantial current pulse due to the large voltage change in Vsw at S1 turn-on time 38, and thereby wastes considerable energy. In fact, the energy loss due to reverse recovery after the second dead time 30b can be greater than the energy loss due to body diode conduction.

The present invention ameliorates these problems by detecting the reversed voltage at the swing node 20 at times 32 and 36, and, in response, turning on switch S1 and S2, respectively.

Figure 3:
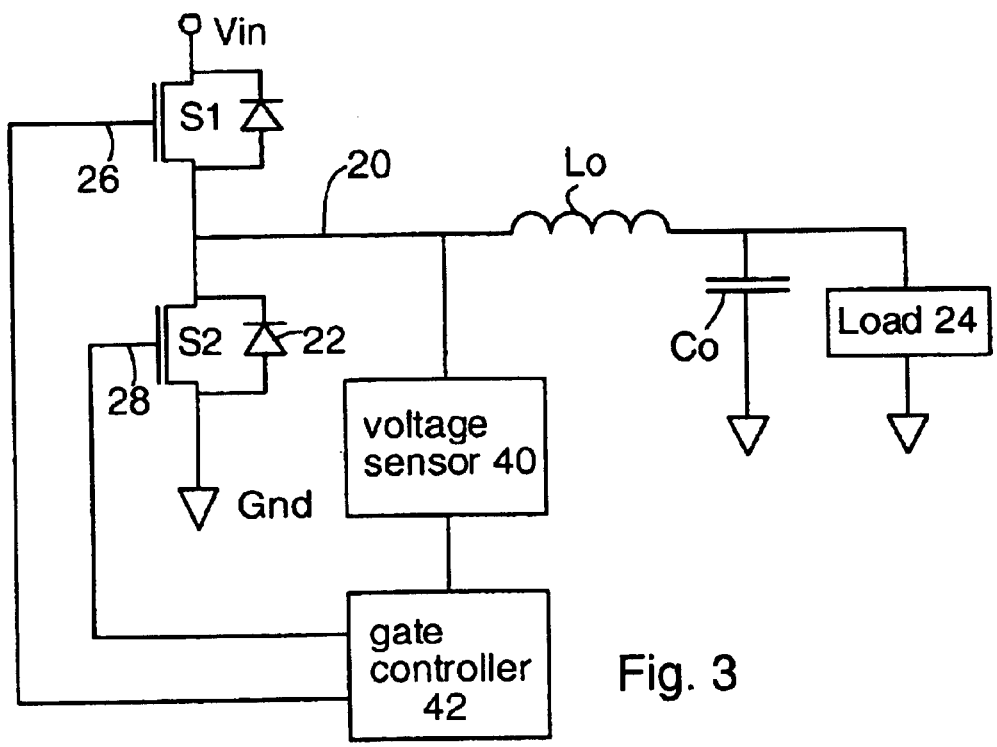
FIG. 3 shows a buck regulator according to the present invention.

FIG. 3 shows a buck regulator according to the present invention. The buck regulator according to the present invention has a voltage sensor 40, and a gate controller 42. The voltage sensor 40 senses swing voltage at the swing node 20, and produces and output capable of triggering the gate controller 42. The output of the voltage sensor is based on the swing node voltage. The gate controller 42 controls the switches S1 and S2 in response to signals received from the voltage sensor 40. Typically, the gate controller 42 comprises digital logic, and so the voltage sensor 40 should output signals capable of triggering digital logic circuitry. The voltage sensor 40 and gate controller 42 are both high speed devices. The voltage sensor and gate controller 42 may be provided with a 5 Volt power supply (not shown).

Figure 4:
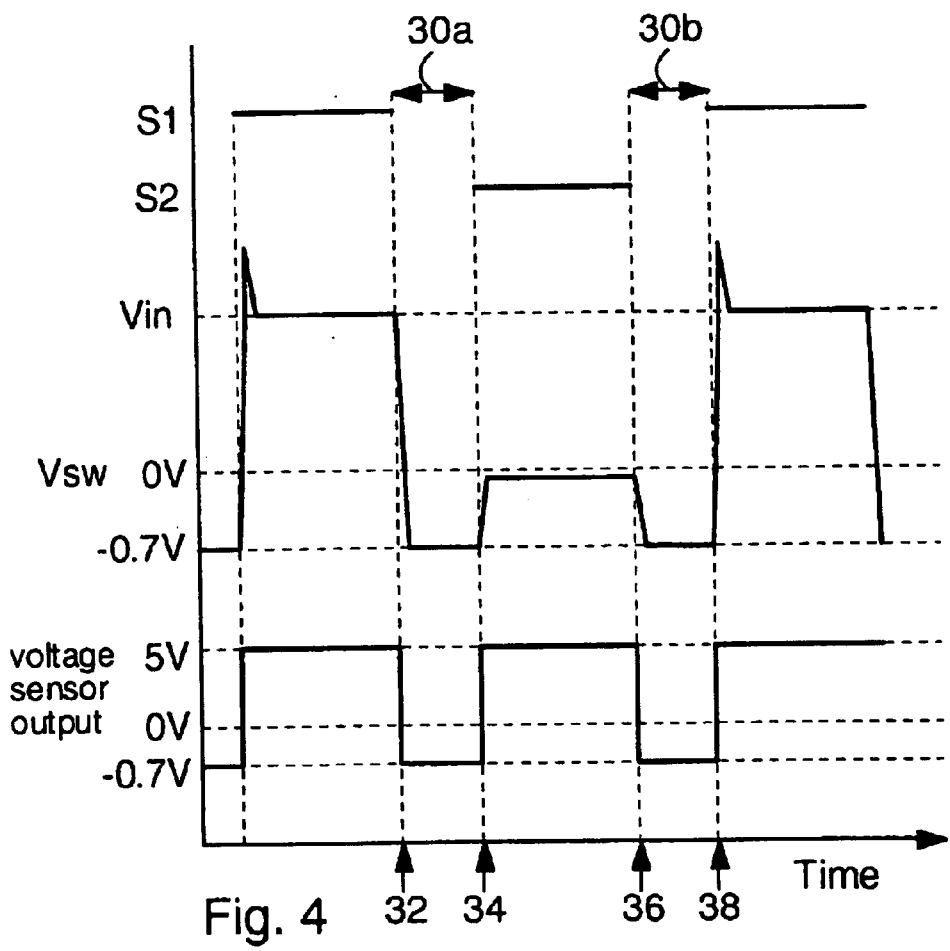
FIG. 4 shows a timing diagram for the buck regulator of FIG. 3.

FIG. 4 shows a timing diagram with an exemplary voltage sensor output. The voltage sensor output is compatible with high speed logic circuitry, and does not produce excessive voltages that could damage the gate controller. The voltage at the swing node, for example, can reach peak values at transition 38 that could damage the gate controller if the gate controlled were directly connected to the swing node 20. At the S1 turnoff time 32 and S2 turn off time 36 the voltage sensor triggers the gate controller. When triggered at S1 turn off time 32, the gate controller 42 turns on switch S2; when triggered at S2 turn off time 36, the gate controller 42 turns on switch S1. First dead time 30a is reduced by rapidly turning on S2 after time 32; second dead time is reduced by rapidly turning on S1 after time 36. The gate controller 42 can be connected to other sensors or logic circuitry to assure that it turns on the appropriate switch (S1 or S2). In this way the voltage sensor 40 and gate controller 42, due to their fast response, can reduce both the first dead time 30a and the second dead time 30b. It is desirable to reduce both the first dead time 30a and the second dead time 30b, since body diode conduction occurs during both dead times. It is particularly preferable to reduce the second dead time to an extent that reverse recovery of body diode 22 is prevented, since reverse recovery of body diode 22 is particularly large at the end of the second dead time 30b.

Detecting the reversed voltage at the swing node 20 provides feedback based on an actual turn-off of the switches S1 or S2, instead of a proxy measurement of switching time based on gate voltages at switches S1 or S2. By sensing the actual turn-off time, the present invention allows dead times 30a 30b to be made very short (e.g. less than 10 nanoseconds), while still assuring that switches S1 and S2 are not on at the same time. Since the present invention senses actual turn-off time of switches S1 S2, variations in the commutation time of switches S1 S2 will not effect durations of the dead times 30a 30b.

Specifically, it is preferable for the voltage sensor 40 and gate controller 42 to be able to turn on S2 or S1 in less than 5 or 10 nanoseconds after times 32 and 36, respectively. This will reduce the durations of the dead times 30a 30b to less than about 10 or 15 nanoseconds, thereby greatly reducing body diode conduction losses.

In order to prevent reverse recovery losses in the body diode 22, the durations of the dead times 30a 30b should be less than a turn-on time of the body diode 22. Body diode 22 typically has a turn-on time of about 10 nanoseconds, so it is particularly useful in the invention to reduce the durations of the dead times 30a 30b to less than about 10 nanoseconds. More generally, it is useful for the durations of the dead times 30a 30b to be reduced to less than the turn-on time of body diode 22. Reverse recovery losses are especially large after the second dead time 30b, since the swing voltage climbs to a high value at time 38, and this voltage is applied across the body diode 22. Therefore, it is particularly useful for the duration of the second dead time 30b to be reduced to less than about 10 nanoseconds, or to an extent that the body diode does not turn on during the second dead time 30b.

Sensing the S1 turn off time 32 will typically be an easier task than sensing S2 turn off 36. This is because Vsw has a relatively large change from Vin to about −0.7 volts at time 32, and Vsw has a relatively small change from about zero volts to about −0.7 volts at time 36. Also, at time 36 Vsw changes very fast, typically in less than about 3 nanoseconds. Therefore, the voltage sensor 40 must be able to sense small, rapid voltage changes, and produce a trigger for the gate controller in response. In addition, the voltage sensor 40 must be capable of withstanding without damage relatively high voltage spikes in Vsw which occur at time 38 (peak voltage at time 38 can be about 5 volts in excess of Vin, depending on leakage inductance and other factors). Preferably, the voltage sensor can respond to a change in the swing node voltage from −0.1 to −0.3 volts in about 1 nanosecond.

Several circuits can be used as the voltage sensor 40, including high speed voltage amplifiers, high speed voltage comparators, and the like. The voltage sensor must have high sensitivity to voltage reversals, high speed, and a tolerance for high peak voltages.

Figure 5:
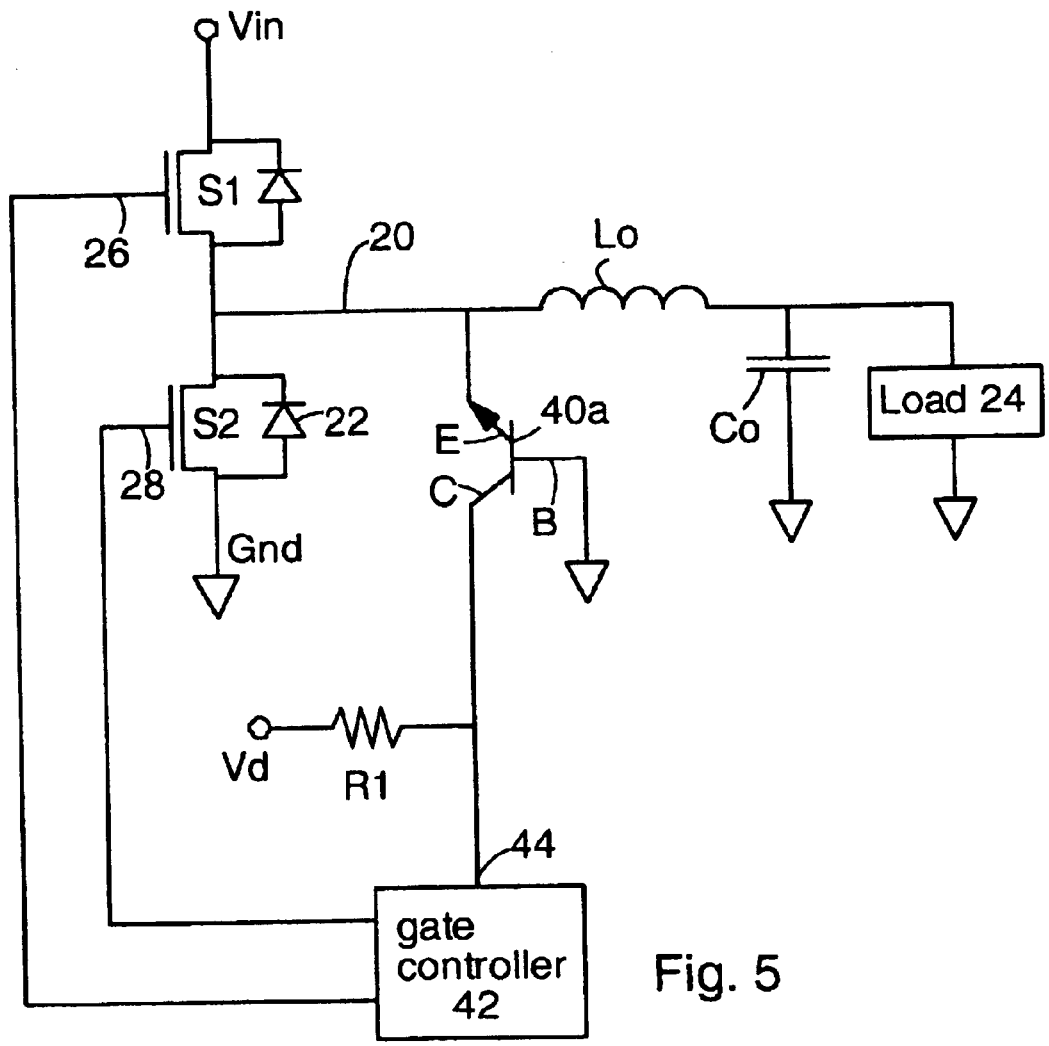
FIG. 5 shows a buck regulator according to the present invention having a bipolar transistor as a voltage sensor.

FIG. 5 shows a specific embodiment of the present invention where the voltage sensor is an NPN bipolar transistor 40a with an emitter E connected to the swing node 20. The transistor 40a has a base B connected to ground potential, or to a potential in the range of about zero to +0.6 volts. The collector C is connected to an input 44 of the gate controller. A resistor R1 is connected to the collector C and a voltage source Vd providing, for example, a digital signal level voltage (e.g. 5 volts). The resistance of resistor R1 is selected so that voltage at collector C drops to about zero and gate controller 42 receives triggers at times 32 and 36. More specifically, resistance of resistor R1 is selected so that voltage at input 44 falls below a trigger threshold of gate controller at or shortly after time 32 and time 36. An appropriate resistance value for resistor R1 can be, for example about 50 kOhms to 250 kOhms. The gain of the transistor 40a can have a wide ranging value, for example in the range of about 10–100.

In operation, transistor 40a is off while S1 or S2 is on. Transistor turns on at times 32 and 36, when swing node voltage Vsw falls below approximately ground potential. At this time, the transistor 40a reduces the voltage at gate controller input 44 below a threshold value, thereby triggering the gate controller. The gate controller 42 in response turns on S1 or S2, depending on which time 32 36 has just occurred.

Transistor 40a should be able to respond to voltage changes of less than 1 volt at the swing node 20 in less than about 2–5 nanoseconds. Such high speed and high sensitivity is essential for reducing the second dead time 30b duration, and thereby reducing the reverse recovery loss of body diode 22.

It is noted that the speed and sensitivity of the bipolar transistor can be improved by connecting the base B to a slightly positive voltage in the range of about 0 to +0.6 volts. Such a slightly positive voltage tends to cause the bipolar transistor to turn on sooner, thereby allowing for shorter dead times 30a 30b. However, it is noted that if the base voltage is too high (e.g. 1 volt), false triggering of the gate controller will result.

Also, it is important for transistor 40a to be able to withstand without damage the high voltage spike that occurs at the swing node 20 at the S1 turn-on time 38. This voltage spike is applied across the emitter-base junction, which is often an easily damaged junction in bipolar transistors.

In another aspect of the present invention, an amplifier (e.g. a current amplifier) is connected between the bipolar transistor 40a, and the gate controller 42. Such an amplifier can boost the signal from the bipolar transistor 40a in case the signal is too weak to reliably trigger the gate controller 42.

A particularly useful bipolar transistor 40a for use in the present invention is a parasitic bipolar transistor integral to a lateral diffusion (LD)MOSFET.

Figure 6A:
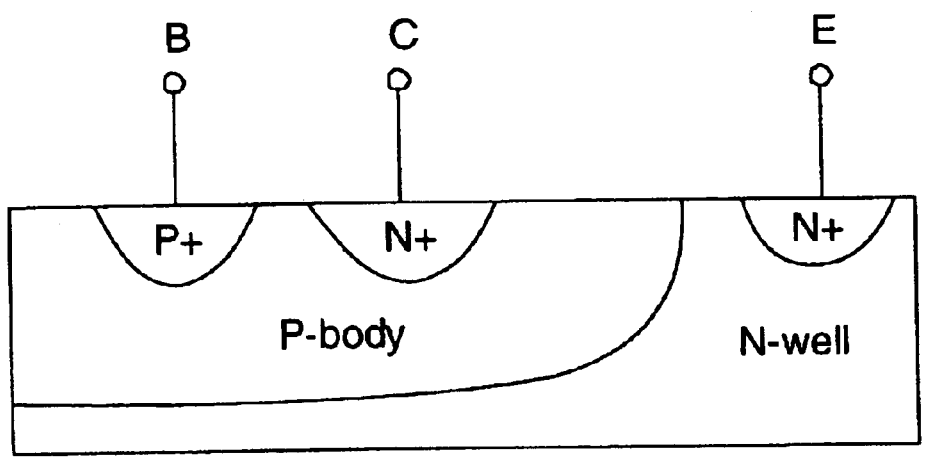
FIG. 6a shows an LDMOSFET structure with connections to employ the parasitic bipolar transistor integral to the LDMOSFET structure.

FIG. 6a shows an LDMOSFET structure with connections to employ the parasitic bipolar transistor integral to the LDMOSFET structure. The transistor of FIG. 6a can be used for bipolar transistor 40a.

Figure 6B:
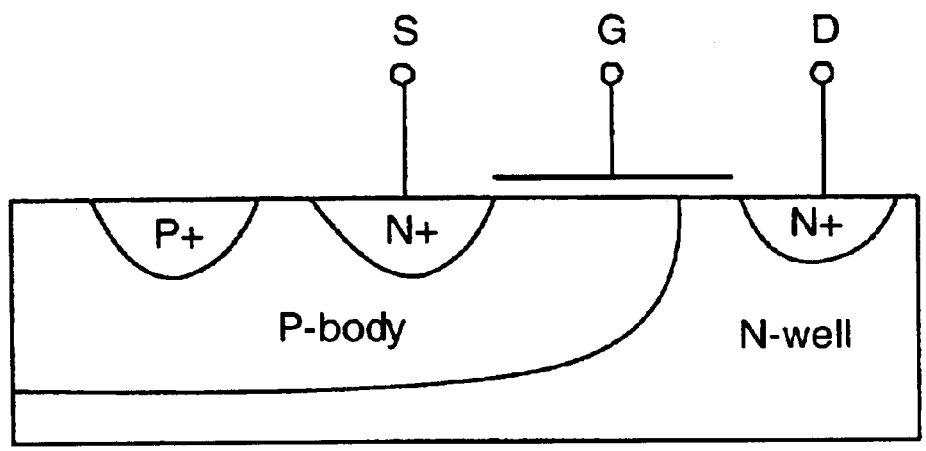
FIG. 6b shows an LDMOSFET.

FIG. 6b shows an LDMOSFET with the same structure as the parasitic bipolar transistor of FIG. 6a, but with connections for operating it as a normal LDMOSFET switch. The transistor of FIG. 6b can be used for switches S1 and S2.

The parasitic bipolar transistor integral to an LDMOSFET shown in FIG. 6a has high speed capability, has high emitter-base reverse blocking voltage capability (due to junction between P-body and N-well), and can be manufactured monolithically with the switches S1 and S2. In fact, S1, S2, and transistor 40a can have exactly the same doping structure, with transistor 40a having different electrical connections, as shown in FIG. 6a. Monolithic fabrication of S1, S2, and transistor 40a is advantageous because it can provide a buck regulator according to the present invention at very low cost.

It is noted that other bipolar transistors with sufficient high speed, high sensitivity, and high emitter-base breakdown voltage can be used. It is also noted that the bipolar transistor should be a PNP transistor and that the base voltage may be slightly negative (e.g. 0 to about −0.6 volts) if the buck regulator operates from a negative power source Vin.

Figure 7:
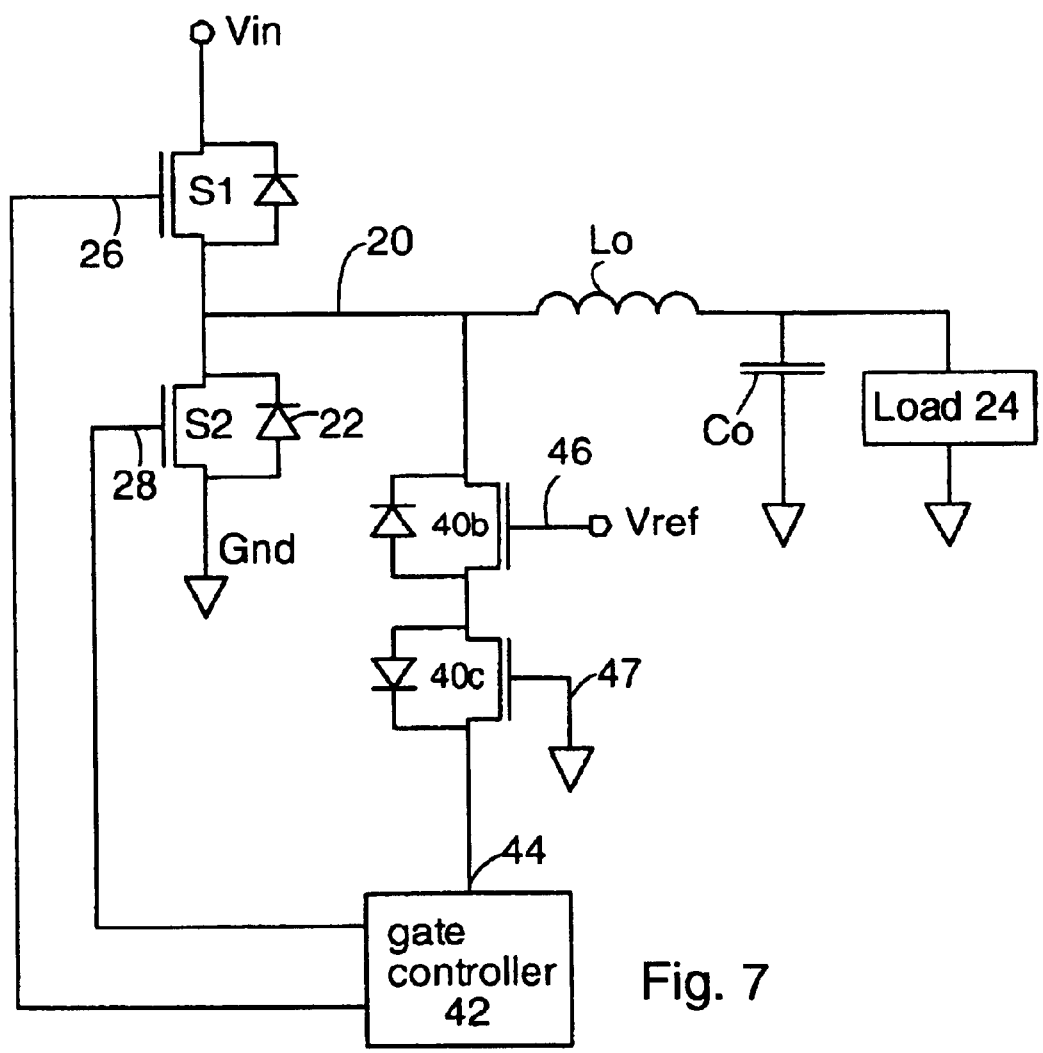
FIG. 7 shows an embodiment of the present invention where the voltage sensor comprises a first sense NLDMOSFET 40b and a second sense NMOSFET 40c.

FIG. 7 shows a specific embodiment of the present invention where the voltage sensor 40 comprises a first sense NMOSFET 40b and a second sense NMOSFET 40c connected in series. First sense NMOSFET 40b and a second sense NMOSFET 40c can be lateral diffusion MOSFETs (NLDMOSFETs). Gate 46 of transistor 40b is connected to a reference voltage Vref (e.g. 5 volts). Reference voltage Vref determines the swing node voltage at which transistor 40b turns on. Preferably, reference voltage Vref is between Vin and zero volts. Gate 47 of second NMOSFET is connected to ground potential, or a potential close to ground potential (i.e. within about 1 volt of ground potential). Second NMOSFET is connected to input 44 of gate controller 42. Transistor 40b can be identical to the switches S1 and S2, thereby simplifying monolithic fabrication. The second sense MOSFET 40c should have a low turn-on threshold voltage, for example a threshold in the range of about 0–0.5 volts.

Figure 8:
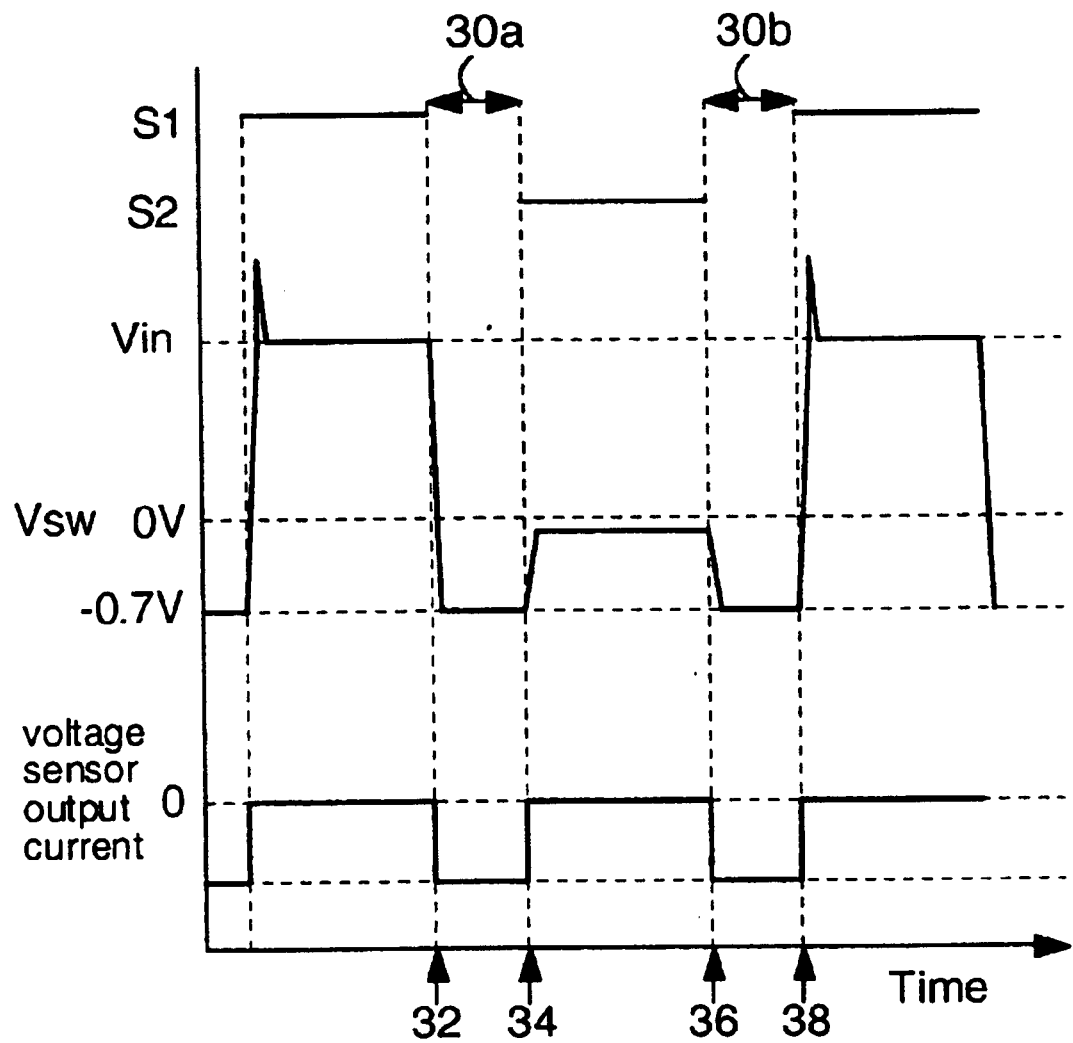
FIG. 8 shows a timing diagram illustrating operation of the circuit of FIG. 7.

FIG. 8 shows a timing diagram illustrating operation of the circuit of FIG. 7. FIG. 8 shows the output current of the voltage sensor comprising NMOSFETs 40b 40c, since the output of the voltage sensor comprising NMOSFETs 40b 40c is best characterized by current instead of voltage. In operation, NMOSFET 40b is off while S1 is on, and voltage sensor output current is zero, or approximately zero. At time 32 and time 36, swing voltage Vsw becomes negative, turning on both NMOSFET 40b, and NMOSFET 40c. This causes voltage sensor output current to become negative, triggering the gate controller 42. When S2 is on, Vsw is approximately zero, NMOSFET 40b may be on or off, NMOSFET 40c will be off, and output current will be approximately zero. From the foregoing, it is understood that the voltage sensor comprising NMOSFET 40b and NMOSFET 40c provides high speed trigger based on current to the gate controller 42 at times 32 and 36. Of course, the gate controller 42 should be constructed so that it is triggered by the currents provided by the NMOSFETs 40b and 40c.

It is noted that the NMOSFETs 40b 40c can be replaced with PMOSFETs if the buck regulator operates from a negative power source Vin.

Figure 9:
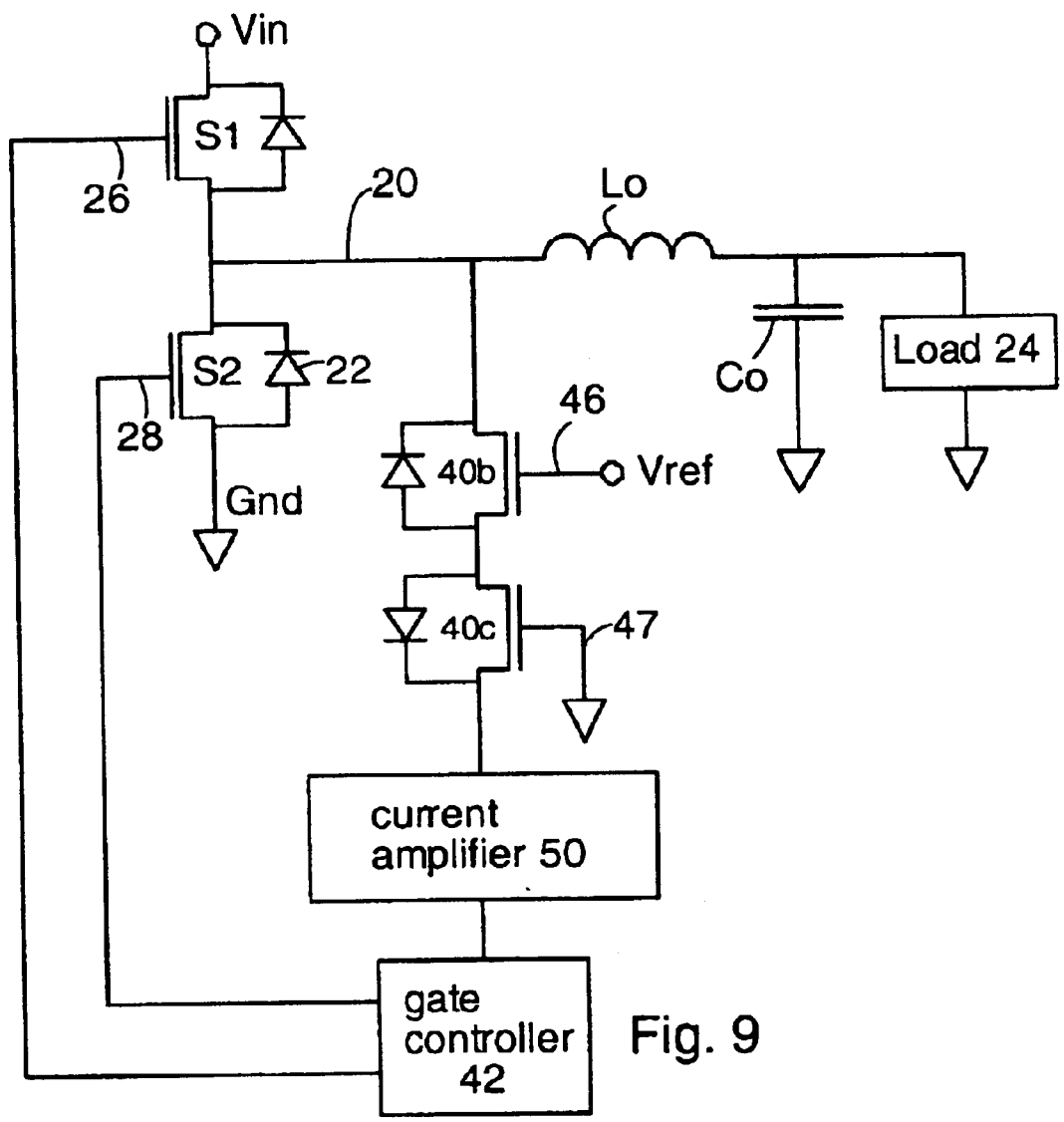
FIG. 9 shows an alternative embodiment having NMOSFETs 40b and 40c in combination with a current amplifier.

FIG. 9 shows an alternative embodiment having NMOSFETs 40b and 40c in combination with a current amplifier 50. The current amplifier receives current from NMOSFET 40c, and provides a trigger for the gate controller 42 based on voltage. The current amplifier 50 should be used where the NMOSFETs 40b 40c do not provide a strong enough trigger for the gate controller 42. The current amplifier should have a high speed response (e.g. less than about 2–3 nanoseconds).

Figure 10:
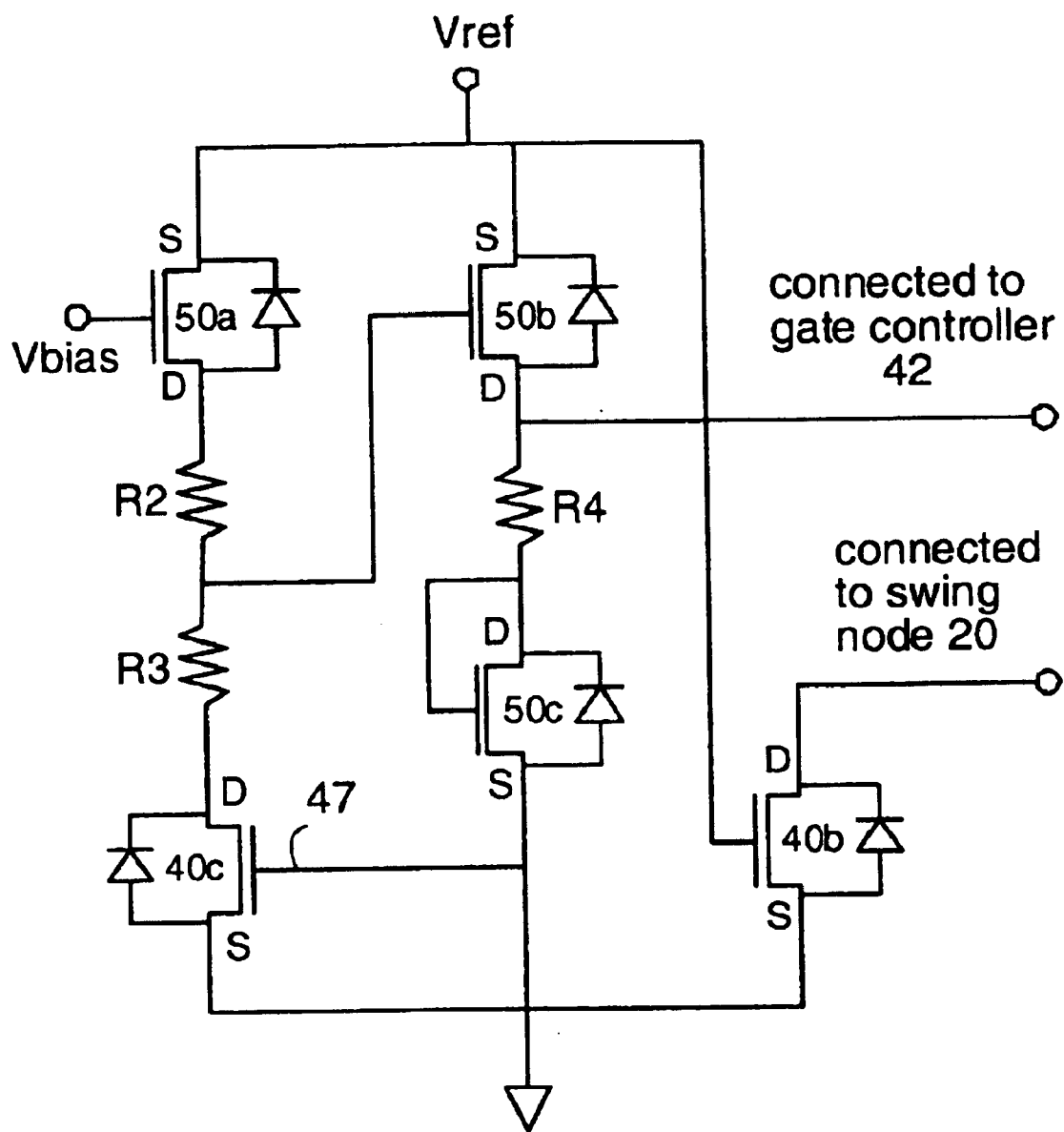
FIG. 10 shows an embodiment of the voltage sensor having NMOSFET 40b and NMOSFET 40c in combination with a specific current amplifier.

FIG. 10 shows a specific implementation of the voltage sensor having NMOSFET 40b and NMOSFET 40c and current amplifier 50. Current amplifier comprises transistors 50a 50b and 50c, in combination with resistors R2 R3 and R4. Transistors 50a and 5b are PMOSFETs, and can be identical. Transistor 50c is an NMOSFET. NMOSFETs 40b and 40c comprise the voltage sensor 40 described above. In operation, transistors 50a 50b 50c cooperate as a current amplifier providing appropriate trigger voltage to the gate controller 42. The trigger output of the current amplifier of FIG. 10 can be a positive-going voltage pulse at times 32 and 36. A bias voltage Vbias can be adjusted to control the gain of the current amplifier. The current amplifier of FIG. 10 is capable of producing a trigger for the gate controller in response a voltage drop at the swing node 20 from −0.1 to −0.3 volts in less than 1 nanosecond.

The present invention provides unique and substantial advantages over conventional buck regulators. Specifically, the present invention is capable of providing much shorter dead times 30a 30b. Because the present invention senses voltage at the swing node 20 (instead of at the gates 26 or 28), the present invention directly senses the turn-off of switches S1 S2. This allows for extremely short dead times 30a 30b because variations in the commutation times of switches S1 S2 are automatically compensated for, and hence, such variations do not effect the durations of dead times 30a 30b. By comparison, some conventional buck regulators sense gate voltage of switches S1 and S2 in order to provide feedback control. This can be problematic because actual turn-on time of switches S1 S2 varies substantially between switches, and with operating conditions, resulting in variation in durations of dead times 30a 30b, and possible damage to the circuit if the dead time is reduced to zero.

It is noted that the present invention has been described mainly in applications where Vin is a positive voltage with respect to the ground potential. However, it is noted that the present invention is equally applicable to embodiments where Vin is negative with respect to ground potential. In this case, appropriate and well known changes should be made to the present circuits. For example, voltage sensor transistor 40a should be a PNP transistor in case Vin is negative. Also, transistors 40b and 40c may be PMOSFETs instead of NMOSFETs. Such expedients are well known in the art and are within the scope of the appended claims.

It will be clear to one skilled in the art that the above embodiment may be altered in many ways without departing from the scope of the invention. Accordingly, the scope of the invention should be determined by the following claims and their legal equivalents.

What is claimed is:

1. A buck regulator comprising:
 a) an output inductor;
 b) a first switch connected to a power source and the output inductor, for charging the output inductor;
 c) a second switch connected to a ground potential, the output inductor, and the first switch;
 d) a swing node at a junction of the output inductor, the first switch, and the second switch;
 e) a voltage sensor connected to the swing node, and having a sensor output;
 f) a gate controller connected to the sensor output, wherein the gate controller provides at least one of the following functions:
  1) the gate controller turns on the second switch when the voltage sensor detects a voltage reversal at the swing node resulting from turn off of the first switch, and
  2) the gate controller turns on the first switch when the voltage sensor detects a voltage reversal at the swing node resulting from turn off of the second switch.

2. The buck regulator of claim 1 wherein the voltage sensor triggers the gate controller in response to a voltage reversal at the swing node with an absolute value greater than 0.3 volts.

3. The buck regulator of claim 1 wherein the voltage sensor comprises a bipolar transistor with an emitter connected to the swing node, and a collector connected to the gate controller.

4. The buck regulator of claim 3, wherein the bipolar transistor comprises a parasitic bipolar transistor integral to a lateral diffusion metal oxide semiconductor field effect transistor (LD-MOSUT).

5. The buck regulator of claim 3, wherein a base of the bipolar transistor is connected to a voltage within 0.7 volts of the ground potential, and of a same polarity as the power source.

6. The buck regulator of claim 1 wherein the voltage sensor comprises:
 a) a first sense MOSFET with a gate connected to a reference voltage and connected to the swing node;
 b) a second sense MOSFET connected in series with the first sense MOSFET and with a gate connected to a voltage within 0.7 volts of ground potential, and of a same polarity as the power source.

7. The buck regulator of claim 6, further comprising a current amplifier connected between the voltage sensor and the gate controller.

8. A buck regulator comprising:
 a) an output inductor;
 b) a first switch connected to a power source and the output inductor, for charging the output inductor;
 c) a second switch connected to a ground potential, the output inductor, and the first switch;
 d) a swing node at a junction of the output inductor, the first switch, and the second switch;
 e) a bipolar transistor with an emitter connected to the swing node, and a collector connected to a sensor output; and
 f) a gate controller connected to the sensor output, wherein the gate controller provides at least one of the following functions:
  1) the gate controller turns on the second switch when the bipolar transistor detects a voltage reversal at the swing node resulting from turn off of the first switch, and
  2) the gate controller turns on the first switch when the bipolar transistor detects a voltage reversal at the swing node resulting from turn off of the second switch.

9. The buck regulator of claim 8, wherein the bipolar transistor comprises a parasitic bipolar transistor integral to a lateral diffusion metal oxide semiconductor field effect transistor (LDMOSFET).

10. The buck regulator of claim 8, wherein a base of the bipolar transistor is connected to a voltage within 0.7 volts of ground potential, and of a same polarity as the power source.

11. A buck regulator comprising:
 a) an output inductor;
 b) a first switch connected to a power source and the output inductor, for charging the output inductor;
 c) a second switch connected to a ground potential, the output inductor, and the first switch;
 d) a swing node at a junction of the output inductor, the first switch, and the second switch;
 e) a first sense MOSFET connected to the swing node and with a gate connected to a reference voltage;
 f) a second sense MOSFET connected in series with the first sense MOSFET and with a gate connected to a voltage within 0.7 volts of ground potential; and
 g) a gate controller connected to the sensor output wherein the gate controller controls the first switch and second switch in response to an output of the second sense MOSFET.

12. The buck regulator of claim 11, further comprising a current amplifier connected between the second sense MOSFET and the gate controller.

13. The buck regulator of claim 11 wherein the second sense MOSFET is a MOSFET.

14. The buck regulator of claim 11 wherein the gate controller turns on the second switch when the voltage sensor detects a voltage reversal at the swing node resulting from turn off of the first switch.

15. The buck regulator of claim 11 wherein the gate controller turns on the first switch when the voltage sensor detects a voltage reversal at the swing node resulting from turn off of the second switch.

16. The buck regulator of claim 1 wherein the gate controller turns on the first switch or second switch less than 10 nanoseconds after the voltage reversal.

17. The buck regulator of claim 11 wherein the gate controller turns on the first switch or second switch less than 10 nanoseconds after the voltage reversal.

* * * * *